United States Patent Office 3,081,226
Patented Mar. 12, 1963

3,081,226
PROCESS FOR REDUCING EXOGENOUS CHOLESTEROL LEVELS IN ANIMAL ORGANISMS
Nicholas R. Di Luzio, Memphis, Tenn., assignor to the United States of America as represented by the United States Atomic Energy Commission
No Drawing. Filed Feb. 24, 1961, Ser. No. 111,117
Claims priority, application Italy Jan. 7, 1961
9 Claims. (Cl. 167—55)

The present invention relates to a method of reducing the cholesterol level of animal organisms. More particularly, it relates to a method of reducing dietary induced cholesterol levels in experimental animal organisms.

The effects of diet on the animal organism constitute a major research effort in the areas of biochemical and physiological research today. The biochemical fate of dietary cholesterol is of particular importance since an excess accumulation in certain areas of the animal organism may cause the onset of the diseased conditions known as cholesterosis and cholesterolemia. For example, the fatty degeneration of blood vessels is characterized by an excess deposition of cholesterol-containing lesions on the intimal layers of the larger blood vessels, such as the aorta. This condition is frequently attributed to an excess dietary cholesterol intake. A well-recognized need exists for and it is a principal object of this invention to provide a method for controlling the exogenous cholesterol level in experimental animal organisms. An additional object is to produce remission of cholesterolemia and cholesterolosis in veterinary animals and humans afflicted with these conditions.

In the study of cholesterol metabolism, it is frequently desirable to ascertain the amount of exogenous cholesterol which is retained by the animal organism. While diet is one way of varying and possibly controlling cholesterol levels, the degree of control is inexact and subject to individual variation. A need exists for and it is another object of this invention to provide a more precise and convenient method of varying and controlling exogenous cholesterol levels as compared to individual diet and control, so that the effects of different cholesterol levels may be studied and observed.

With these and other objects in mind, the method of reducing the exogenous cholesterol accumulation in accordance with the present invention comprises administering a Kupffer cell stimulating saccharide in a neutral physiological carrier to an animal organism, wherein the saccharide consists of at least two glucopyronosic units, each unit being linked to the other by a 1-3 β glycosidic linkage.

I have discovered that upon introduction of this specific class of sugars into the blood stream of experimental animals maintained on an abnormally high cholesterol diet, a profound reduction of cholesterol levels in the tissues of the liver and plasma of said animals will result. I have found that the 1-3 β glycosidic sugars have a general pharmacological effect on the reticuloendothelial system as a whole, and a specific pharmacological effect on the Kupffer cells of the liver. Since prior workers has established to a reasonable degree that the Kupffer cells participate in cholesterol metabolism, it is reasonable to presume that the saccharides used in the method of the present invention function to stimulate or hyper-activate the Kupffer cells and that the hyperactivated Kupffer cells function to release and/or reduce excess accumulations of ingested cholesterol. However, this suggested mechanism of control of dietary cholesterol levels is not intended in any way to limit the scope of the method of my invention.

The saccharides which stimulate the Kupffer cells and induce an accelerated rate of cholesterol metabolism are sugars consisting of a chain of at least two glucopyronosic units united by a 1-3 β glycosidic linkage. The preparation of one particular polysaccharide, glucan, which is useful in the process of this invention is characterized and described in an article by Hassid in the Journal of the American Chemical Society, vol. 63, 1941 (pp. 295–298).

A polysaccharide having the unique 1-3 β glycosidic linkage which is useful for reducing the liver and plasma cholesterol levels includes laminarin, a naturally occurring carbohydrate obtained from certain species of seaweed. Di, tri, and tetra saccharides, such as laminaribiose and laminaritriose, which have the unique 1-3 β glycosidic structure may also be used to induce Kupffer cell hyperactivity and/or reduce the accumulation of elevated cholesterol levels in the liver and plasma.

Having described the general scope of the process of this invention and its mode of pharmacological action, the following examples will illustrate the manner by which it may be applied.

EXAMPLE I

The purpose of this experiment was to evaluate the role of Kupffer cells in controlling metabolism of ingested cholesterol. If the concept of assigning a specific role to the Kupffer cells in the biotransformation and/or excretion of cholesterol is correct, it would be anticipated that, during Kupffer cell hyperplasia and/or hyperfunction, increased tolerance to ingested cholesterol should develop, as manifested by reduced tissue cholesterol levels of animals maintained on an excessive intake of dietary cholesterol. To evaluate this concept of Kupffer cell participation in cholesterol metabolism, the influence of Kupffer cell hyperactivity on tissue cholesterol levels was studied in rats maintained on normal and high cholesterol, high fat diets. The reticuloendothelial system in general, and the Kupffer cells of the liver specifically, were stimulated by intravenous injections of an aqueous suspension of polysaccharide containing yeast extract known as zymosan. The zymosan in this and in the following experiments was prepared from *Saccharomyces cerevisiae* by the procedure of Pillemer and Ecker as described in the Journal of Biological Chemistry, 137, 139, 1941. Whenever reference is hereafter made to zymosan, it will be understood that it refers to the composition made from the particular yeast by the method of Pillemer and Ecker.

In this experiment, 48 male rats were employed; 13 normal rats were maintained on a "Purina" chow diet and were periodically injected with an aqueous solution; 11 rats received zymosan in the form of an aqueous suspension. The remaining group of 24 rats were subdivided into two groups; 12 animals were fed on the atherogenic diet and 12 were fed an atherogenic diet and, in addition, were injected with the same amount of zymosan. The Purina "Laboratory Chow" diet composition was obtained from the Ralston Purina Company; the composition of the atherogenic diet was as follows:

| | Percent |
|---|---|
| Casein "vitamin free" | 19.9 |
| Sucrose | 18.1 |
| Salt mix (U.S.P. XIV) | 7.3 |
| Alphacel (non-nutritive bulk) | 9.1 |
| Vitamin diet fortification mixture | 1.8 |
| Thiouracil | 0.3 |
| Choline chloride | 0.2 |
| Sodium cholate | 1.8 |
| Butter | 37.0 |
| Cholesterol | 4.5 |

Intravenous injections of zymosan suspension were administered on alternate days to the rats maintained on the atherogenic diet until they had received a total dosage of 140 mg. Daily measurements were made of body weight and food intake. On the 15th day, liver, plasma, and spleen lipids were determined according to the procedure described in the American Journal of Physiology, vol. 196, p. 884, 1959. The results are summarized in Table I.

Table I

| Group | No. | Body-weight (gm.) | | Liver (percent body-weight) | Spleen (percent body-weight) | Liver cholesterol level | | | Neutral fat |
|---|---|---|---|---|---|---|---|---|---|
| | | Initial | Final | | | Free | Ester | Total | |
| Control | 9 | 209 | 265 | 3.7 | 0.23 | 1.82 | 0.71 | 2.53 | 9.14 |
| Control and zymosan | 9 | 206 | 211 | 6.3 | 1.10 | 2.18 | 0.35 | 2.54 | 6.81 |
| Cholesterol-fed | 9 | 201 | 198 | 5.4 | 0.24 | 4.60 | 50.56 | 54.57 | 33.93 |
| Cholesterol-fed and zymosan | 9 | 212 | 168 | 7.1 | 0.78 | 3.45 | 17.20 | 20.98 | 17.89 |

NOTE.—Lipid values are expressed as mgm./gm. of fresh tissue weight.

It will be seen that zymosan administration increased liver and spleen weight. Tissue lipids were not significantly altered in normal (cholesterol free diet) rats given zymosan. This showed that the zymosan composition essentially had no pharmacological or physiological effect on animals maintained on the normal cholesterol-free diet. Maintenance of rats on the atherogenic diet produced elevated ester cholesterol levels in the liver, plasma and spleen. The intravenous administration of zymosan in 10 milligram amounts, on alternate days, to rats maintained on the atherogenic diet induced an increase in liver and spleen weight comparable to that of the zymosan treated animals fed on the normal diet. However, zymosan treatment markedly reduced the accumulation of free and ester cholesterol and neutral fat of the liver (as shown in Table I) as well as in the plasma of those animals on the atherogenic diet receiving zymosan. The zymosan treatment had no effect upon the cholesterol level of the spleen.

In a companion experiment, the effectiveness of zymosan in inhibiting cholesterol accumulation in animals maintained on a somewhat lower cholesterol diet was undertaken. Six male rats were pair-fed the Purina chow diet to which was added one percent, by weight, cholesterol and 0.5 percent sodium cholate. The results are summarized in Table II below, from which it will be seen that in the untreated cholesterol fed rats, the liver cholesterol concentration was markedly elevated, while a significant reduction occurred in the liver ester cholesterol fraction of rats that were injected daily with zymosan in the amount of 5 milligrams per day, beginning one day before the start of the feeding to a total dosage of 30 mgs. of zymosan.

Table II

| Group | Body-weight (percent) | | Liver cholesterol level [1] | | |
|---|---|---|---|---|---|
| | Liver | Spleen | Total | Free | Ester |
| Normal | 3.41 | 0.19 | 2.16 | 1.91 | 0.25 |
| Cholesterol-fed | 3.01 | 0.24 | 18.03 | 3.20 | 14.83 |
| Cholesterol-fed and zymosan | 3.95 | 0.69 | 4.48 | 2.26 | 1.82 |

[1] Values are expressed as mgm. of cholesterol per gm. of fresh tissue.

A histological investigation of all the rats showed that the Kupffer cells of the rats injected with the zymosan suspension were in a hyperplastic condition.

It has thus been shown that elevated tissue cholesterol levels of rats maintained on high cholesterol diets are a function of the Kupffer cell activity and that the Kupffer cell activity, in turn, is a function of some ingredient of the zymosan composition. It is further apparent that the action of some component of the zymosan composition results in reduced plasma and liver cholesterol levels produced by a dietary cholesterol excess. These findings not only indicate and delineate the metabolic function of the Kupffer cells in cholesterol metabolism, but also indicate that conditions of hypercholesterolemia and cholesterosis may be manageable by regulating the physiological activity of the Kupffer cells by the specific saccharides used in the method of the present invention.

EXAMPLE II

The purpose of this example is to identify and demonstrate the active zymosan component which induces hyperactivity in the Kupffer cells and effects reduction of free and ester cholesterol levels in the liver and plasma of animals maintained on a high cholesterol diet.

A zymosan composition was prepared in accordance with the procedure described in Example I and was extracted to form several fractions as follows:

(1) Lipid I. This fraction was obtained by treating zymosan with chloroform, and contained triglycerides and lipids.

(2) Residue A. This fraction was obtained after extraction of zymosan with chloroform to obtain a fraction containing polysaccharides and proteins and some bound lipids.

(3) Residue B was obtained by chloroform, ether extraction followed by acid hydrolysis. This fraction contained polysaccharides, glucan, mannan, and protein.

For purposes of further comparison, a mannan and glucan composition was prepared. The mannan was prepared from the yeast cell walls by the method of Haworth as disclosed in the Journal of the Chemical Society, 784, 1937; the glucan was prepared by the method of Hassid as disclosed in the Journal of the American Chemical Society, 63, 295, 1941.

The zymosan and the various extracts outlined above were injected intravenously into a group of male and female rats. The dose of zymosan was 4 milligram/100 gm. of body weight. Control rats received equivalent volumes of saline. A portion of the zymosan was prepared in a suspending medium, Tween–80, (polyoxyethylene sorbitan mono-oleate). All yeast cell fractions were suspended in 0.05% Tween–80 in a concentration of 5 milligrams/milliliter. A set of control rats were injected with equivalent volumes of 0.05% Tween–80. Male and female rats were injected intravaneously with 1 milligram/100 gram body weight of the various fractions derived from zymosan including the mannan fraction isolated from yeast by the method of Haworth as described in the Journal of the Chemical Society, 784, 1937. The results showed that the Tween was acting as a substantially inert carrier for the zymosan, that is, essentially no physiological or pharmacological effect could be ascribed to the Tween carrier suspending medium.

The effect of the lipid I fraction on the Kupffer cell activity was comparable to the effect noted in the Tween–80 injected control rats, i.e., rats injected with these fractions suspended in Tween–80 showed no observable alteration in the normal histology of the Kupffer cells. Liver, lung and spleen weights were unaltered in animals which were administered these fractions. The same effect was noted in animals treated with mannan. In marked contrast to mannan and the lipid I fraction, the glucan containing preparations derived from yeast cells or from zymosan residue fractions A and B produced a hyperplasia in the Kupffer cells of the liver. Histological studies showed that the unfractionated zymosan was actively phagocytized by the Kupffer cells and solubilized within 24-48 hours. That the induced Kupffer cell hyperplasia was not due to the particulate nature of the zymosan was demonstrated by the fact that, in a separate experiment, injection of 3 micron size iron particles produced no Kupffer cell or reticuloendothelial hyperplasia.

EXAMPLE III

The purpose of this experiment is to demonstrate the influence of glucan on rats maintained on a high cholesterol diet. Twelve rats obtained from Holtzman & Co., Madison, Wisconsin, were maintained on a high cholesterol diet as described in Example I (Table II). Six of the rats were periodically injected with the Tween suspension medium; and six experimental rats were injected with glucan suspended in the Tween medium. The glucan was obtained from *Saccharomyces cerevisiae*—method of Hassid, Journal of American Chemical Society, 63, 295, 1941. The dose of glucan was 1 mg./100 gm. body weight. After 18 milligrams of glucan were administered to the experimental rats, all of the rats were sacrificed and the cholesterol and triglyceride concentrations in the liver, plasma and lungs were determined according to the procedure described in Example I. The results are summarized in Table III and confirm the effect of glucan on reducing the cholesterol level in liver. An examination of the liver of all the animals showed hyperplasia in the Kupffer cells in the glucan treated group and substantially no change in the animals not receiving glucan.

Table III

| Group (6 animals in each group) | Liver | | | Plasma | | | Lung | | |
|---|---|---|---|---|---|---|---|---|---|
| | Cholestreol | | Tri-glyceride | Cholesterol | | Tri-glyceride | Cholesterol | | Tri-glyceride |
| | Free | Ester | | Free | Ester | | Free | Ester | |
| Tween | 3.12 | 18.65 | 13.88 | 0.275 | 1.29 | 0.567 | 5.38 | 0.60 | 6.22 |
| Glucan | 3.44 | 11.72 | 9.04 | 0.290 | 1.22 | 0.421 | 5.30 | 0.63 | 5.59 |

NOTE.—Mean values in mg./gm. of liver, or ml. of plasma.

EXAMPLE IV

A set of 17 rabbits were separated into three groups; 6 rabbits designated as the control group were maintained on a Purina chow diet as described in Example I. Six rabbits were maintained on an atherogenic diet as shown in Example I and were periodically injected with a saline solution. The third group, designated as the experimental group, consisting of 5 rabbits, were maintained on the atherogenic diet and were also injected intravenously weekly with zymosan (50-75 mg./week) suspended in the saline solution. At the end of three months, after 800 mgm. of zymosan had been administered, the animals were sacrificed and the lipid and cholesterol contents were determined in the plasma and aorta. The results are summarized in Tables IV and V.

Table IV

INFLUENCE OF CHOLESTEROL AND ZYMOSAN ON PLASMA LIPIDS IN RABBITS [1]

| | | Control (Purina Chow) | Cholesterol and saline | Cholesterol and zymosan |
|---|---|---|---|---|
| Initial sample | Phospholipid | 1.43 | 1.33 | 0.88 |
| | Cholesterol {Free | 0.157 | 0.198 | 0.125 |
| | {Ester | 0.184 | 0.292 | 0.197 |
| | Neutral fat | 1.502 | 1.543 | 1.481 |
| One month | Phospholipid | 1.19 | 6.06 | 4.29 |
| | Cholesterol {Free | 0.206 | 4.00 | 2.62 |
| | {Ester | 0.334 | 11.74 | 7.83 |
| | Neutral fat | 2.25 | 3.92 | 0.416 |

[1] Values expressed as mg. of lipid/ml. of plasma.

Table V

INFLUENCE OF CHOLESTEROL AND ZYMOSAN ON AORTIC LIPID [1]

| Type | Number animals | Cholesterol, mgm./gm. wet weight | | | Cholesterol, mgm./gm. dry defatted weight | | |
|---|---|---|---|---|---|---|---|
| | | Free | Ester | Total | Free | Ester | Total |
| Control (Purina Chow) | 6 | 1.23 | 0.12 | 1.35 | 5.16 | 0.562 | 5.73 |
| Cholesterol and saline | 6 | 5.82 | 9.82 | 17.30 | 28.69 | 56.71 | 85.40 |
| Cholesterol and zymosan | 5 | 4.56 | 5.47 | 10.03 | 21.26 | 25.56 | 46.82 |

[1] Values expressed as mg. of lipid/gm. of fresh tissue.

It will be seen that the zymosan (containing glucan) had a profound effect both on the plasma cholesterol as well as the aorta cholesterol content in comparison to the non-zymosan treated animals. The plasma cholesterol was reduced by about 44 percent and the cholesterol content of the aorta was reduced to less than half of that found in the non-zymosan group.

It will thus be seen that a method has been described for reducing the exogenous cholesterol of animals maintained on an atherogenic diet, and that administration of the active saccharides of the class described to such animals, namely, those consisting of at least two glucopyronosic units joined by a 1-3 β glycosidic linkage, produces this effect. In using the saccharides of the class described, consideration should be given to the fact that in addition to effecting reduction of exogenous cholesterol in animal tissues, these compounds have a stimulatory effect on the reticuloendothelial system as a whole. Saccharide dosages should thus be administered to obtain the maximum desired cholesterol reduction without adversely influencing tissues of the reticuloendothelial system. The saccharides of this invention may be applied with advantage to reduce excess exogenous cholesterol levels in animals of veterinary interest such as the dog. Remission of conditions of cholesterolemia and cholesterosis in the dog may be effected by intravenous administration, over a period of time, of from 5–10 milligrams per kilogram of body weight in an inert physiological carrier.

This invention is also useful in effecting remission in experimental animals suffering from cholesterolemia and/or cholesterosis to reduce plasma and liver cholesterol levels and reduce excess cholesterol deposition in the intimal layers of blood vessels. Remission of these conditions can be effected by intravenous administration, over a period of time, of from 5–15 milligrams of laminarin or glucan per kilogram of body weight dissolved or dispersed in an inert physiological carrier. A suitable carrier for this purpose is an aqueous solution of a surface active agent such as sodium versenate. Higher dosages will reduce, rather than enhance, the effectiveness of the 1-3 β glycosidic saccharide to reduce cholesterol levels in the individual treated. Moreover, at higher dosages, a condition of erythrophagocytosis may develop in some cases.

The saccharides of lower molecular weight having the specific structure described will generally produce the maximum desired cholesterol reduction and Kupffer cell stimulation with minimum stimulatory effect on the remainder of the reticuloendothelial system. Specifically, the di-saccharide, laminaribiose, the tri-saccharide, laminaritriose, and the tetra-saccharide having the particular 1-3 β glycosidic linkage may be used to advantage for this purpose.

Having described my invention and demonstrated various embodiments thereof, the scope of my invention will now be defined by the following claims:

1. A method for effecting reduction of the exogenous cholesterol level in the plasma and liver of an animal organism which comprises administering a saccharide, in a neutral physiological carrier, to said animal, said saccharide being characterized in that it consists of at least two glucopyronosic units, each unit being joined to the other by a 1-3 beta glycosidic linkage and selected from glucan, laminarin, laminaribiose, and laminaritriose.

2. A method for effecting reduction of the exogenous cholesterol level in the plasma and liver of an animal organism which comprises administering glucan in a neutral physiological carrier to said animal.

3. A method for effecting reduction of the exogenous cholesterol level in the plasma and liver of an animal organism which comprises administering laminarin in a neutral physiological carrier to said animal.

4. A method for effecting reduction of the exogenous cholesterol level in the plasma and liver of an animal organism which comprises administering laminaribiose in a neutral physiological carrier to said animal.

5. A method for effecting reduction of the exogenous cholesterol level in the plasma and liver of an animal organism which comprises administering laminaritriose in a neutral physiological carrier to said animal.

6. A process for producing remission in an experimental laboratory animal suffering from cholesterolemia produced from exogenous cholesterol ingestion which comprises administering to said animal, over a period of time, a saccharide in a neutral physiological carrier, said saccharide being characterized in that it consists of at least two glucopyronosic units, each unit being joined to the other by a 1-3 beta glycosidic linkage and selected from glucan, laminarin, laminaribiose, and laminaritriose.

7. The method according to claim 6 in which the saccharide is glucan and is administered intravenously in an inert physiological carrier in an amount ranging from 5–15 mg. per kilogram of body weight.

8. The method according to claim 6 in which the saccharide is laminarin and is administered intravenously in an inert physiological carrier in an amount ranging from 5–15 mg. per kilogram of body weight.

9. A process for producing remission in an experimental laboratory animal suffering from cholesterolemia and cholesterosis produced from exogenous cholesterol ingestion which comprises administering to said animal, over a period of time, a saccharide in a neutral physiological carrier, said saccharide being characterized in that it consists of at least two glucopyronosic units, each unit being joined to the other by a 1-3 beta glycosidic linkage and selected from glucan, laminarin, laminaribiose, and laminaritriose.

References Cited in the file of this patent

Mookerjea: Chem. Abst., vol. 52, 1958, page 9445f.
Hawkins: Can. J. of Biochem. and Phys., vol. 36, 1958, pages 161–170.